United States Patent
Dalloro et al.

(10) Patent No.: US 11,474,492 B2
(45) Date of Patent: Oct. 18, 2022

(54) APPARATUS AND METHOD FOR AUTONOMOUSLY ADDING AND REMOVING OF FUNCTIONALITY IN PROGRAMMABLE LOGIC CONTROLLERS (PLCS)

(71) Applicant: Siemens Aktiengesellschaft, Munich (DE)

(72) Inventors: Livio Dalloro, Plainsboro, NJ (US); Thomas Gruenewald, Somerset, NJ (US); George Lo, Langhorne, PA (US); Justinian Rosca, West Windsor, NJ (US)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 274 days.

(21) Appl. No.: 16/648,383

(22) PCT Filed: Sep. 19, 2017

(86) PCT No.: PCT/US2017/052137
§ 371 (c)(1),
(2) Date: Mar. 18, 2020

(87) PCT Pub. No.: WO2019/059880
PCT Pub. Date: Mar. 28, 2019

(65) Prior Publication Data
US 2020/0285213 A1 Sep. 10, 2020

(51) Int. Cl.
*G06F 9/445* (2018.01)
*G06F 8/61* (2018.01)
(Continued)

(52) U.S. Cl.
CPC ............ *G05B 19/056* (2013.01); *G06F 9/54* (2013.01); *G06F 16/9535* (2019.01);
(Continued)

(58) Field of Classification Search
CPC ..... G06F 8/65; G06F 8/71; G06F 8/34; G06F 8/61; G06F 21/56; G06F 21/567;
(Continued)

(56) References Cited

U.S. PATENT DOCUMENTS 10,068,270 B1 * 9/2018 Kay .......................... G06F 8/61
2012/0110174 A1 * 5/2012 Wootton ............. H04L 63/1416
709/224
(Continued)

FOREIGN PATENT DOCUMENTS

WO 20160111694 A1 7/2016
WO 20160167768 A1 10/2016

OTHER PUBLICATIONS

Aqle et al., Mobile app conceptual browser: Online marketplaces information extraction, 8 pages (Year: 2016).*
(Continued)

*Primary Examiner* — Thuy Dao

(57) ABSTRACT

A system for autonomously providing functionality to a computerized control system includes a logic controller running a first computer application relating to an operations system and an application manager that receives requests for functionality from the first computer application. A remote marketplace client is in communication with the application manager and a remote marketplace that offers computer applications for providing a plurality of functionalities relating to the operations system. A computer application repository stores computer applications providing functionality of the operations system and responsive to receiving the request for functionality the application manager forwards
(Continued)

the request to the remote marketplace client. The remote marketplace client queries the remote marketplace for the requested functionality and provides results of the query to the application manager. The application manager performs logic operations on the query results to identify an application to provide the requested functionality. The identified application is downloaded from the marketplace.

15 Claims, 3 Drawing Sheets

(51) Int. Cl.
| | | |
|---|---|---|
| *G06F 9/06* | (2006.01) | |
| *G06F 9/455* | (2018.01) | |
| *G06F 21/64* | (2013.01) | |
| *G06F 8/65* | (2018.01) | |
| *G06F 8/41* | (2018.01) | |
| *G05B 19/05* | (2006.01) | |
| *G06F 16/9535* | (2019.01) | |
| *G06F 9/54* | (2006.01) | |
| *G06Q 10/00* | (2012.01) | |
| *G06Q 20/12* | (2012.01) | |
| *G06Q 30/06* | (2012.01) | |
| *G06Q 50/04* | (2012.01) | |

(52) U.S. Cl.
CPC ........... *G06Q 10/20* (2013.01); *G06Q 20/123* (2013.01); *G06Q 30/0627* (2013.01); *G06Q 50/04* (2013.01); *G05B 2219/23297* (2013.01); *G05B 2219/23298* (2013.01)

(58) Field of Classification Search
CPC ....... G06F 16/9535; G06F 9/54; H04L 67/34; H04L 67/10; H04L 67/1095; H04L 67/306; A63F 13/20; A63F 13/23; A63F 13/352; G05B 19/056; G05B 2219/23297; G05B 2219/23298; G06Q 10/20; G06Q 20/123; G06Q 30/0627; G06Q 50/04
See application file for complete search history.

(56) References Cited

U.S. PATENT DOCUMENTS

| | | | | |
|---|---|---|---|---|
| 2012/0265804 | A1* | 10/2012 | Ashcraft | G06F 9/445 709/203 |
| 2013/0091542 | A1* | 4/2013 | Cohen | G06F 21/604 726/1 |
| 2013/0139264 | A1* | 5/2013 | Brinkley | G06F 21/54 726/23 |
| 2016/0162275 | A1* | 6/2016 | Morley | H04L 67/02 717/170 |
| 2017/0206078 | A1* | 7/2017 | Cohen | G06F 8/65 |

OTHER PUBLICATIONS

International Search Report dated Jun. 8, 2018; Application No. PCT/US2017/052137; 13 pages.

* cited by examiner

APPARATUS AND METHOD FOR AUTONOMOUSLY ADDING AND REMOVING OF FUNCTIONALITY IN PROGRAMMABLE LOGIC CONTROLLERS (PLCS)

CROSS REFERENCE TO RELATED APPLICATIONS

This application is a national phase filing under 35 U.S.C. § 371 of International Patent Application No. PCT/US2017/052137, filed Sep. 19, 2017, which is incorporated herein by reference in its entirety.

TECHNICAL FIELD

This disclosure relates to computerized control systems in manufacturing.

BACKGROUND

A programmable logic controller (PLC) is used in industrial applications to provide ruggedized control of manufacturing processes by use of a digital computer. PLCs provide real-time control producing outputs in response to input conditions where the outputs are required within a limited amount of time.

The architecture in PLCs is hierarchical and uses a push model to manually download function into control devices (e.g. PLC's or field devices). Push models require manual intervention from a user. For example, adding functionality to a PLC requires manual intervention from a user including connecting a workstation to the PLC and pushing the additional functionality to the controller, an action which is initiated by the user.

Manual processes such as those described above require physical resources, such as trained user to be on location with the PLC. In addition, access to the PLC must be granted to push the desired changes to the PLC. This may lead to system downtime in turn, leading to economic losses. Methods and systems that address these challenges are desired.

SUMMARY

This disclosure describes an apparatus and method of adding and/or removing functionality in control devices autonomously. The control device acts as a user in contrast to a push model. The PLC pulls desired functionality from an application (APP) repository. The repository may be a commonly accessible data store, such as an online Marketplace that provides various functionality solutions to users with access to the data store. Additionally, according to aspects of embodiments described herein, the PLC may autonomously dispose of unwanted or unneeded functionality with the aim of managing processing resources most effectively.

A system for autonomously providing functionality to a computerized control system includes, a logic controller running a first computer application relating to an operations system. The system further includes an application manager that receives requests for functionality from the first computer application, and a remote marketplace client in communication with the application manager and a remote marketplace. The remote marketplace offers computer applications that provide a plurality of functionalities relating to the operations system. The system also includes a computer application repository for storage of computer applications providing functionality to the operations system. Responsive to receiving the request for functionality, the application manager forwards the request to the remote marketplace client. The remote marketplace client queries the remote marketplace for the requested functionality and provides results of the query to the application manager.

According to an embodiment, the system may further include a computerized application run-time environment for executing one or more computer applications stored in the computer application repository. According to one embodiment, the system may further include an application runtime application programming interface (API) for providing interconnection of a computer application to functionality of the operations system. In other embodiments the application manager is configured to perform logic operations on the results of the query, and identify a computer application in the remote marketplace for providing the requested functionality.

According to aspects of another embodiment, the remote marketplace client receives the identified computer application from the application manager and responsive to receipt of the identified application initiates a transfer of the identified computer application from the remote marketplace to the computer application repository. The system may further include a computerized application run-time environment for executing one or more computer applications stored in the computer application repository. The system may further include an application runtime application programming interface (API) for providing interconnection of a computer application to functionality of the operations system; and the transferred application is developed based at least in part on the application runtime API.

Some embodiments of the system may include the application manager being configured to determine if functionality associated with a computer application stored in the computer application repository has not been used for a time interval that exceeds a predetermined threshold, with the application manager deleting the computer application if its functionality has not been used in the predetermined time interval. In one embodiment, the first computer application is a diagnostics application of the operations system, and the request for functionality is a request for maintenance scheduling.

According to other aspects of embodiments of the system, a control runtime is included and configured to receive input values of the operations system and calculate output values of the operations system. The operations system may be controlled in a first part by the control runtime, and in a second part by the computer application runtime.

A method for autonomously adding or deleting functionality from a computer control system includes in a control processor, generating a request for functionality based on an output value of an element of an operational system, receiving in an application manager, the request for functionality, communicating the request for functionality to a remote marketplace client from the application manager, querying, by the remote marketplace client, a remote application marketplace to identify one or more computer applications providing the requested functionality, selecting, in the application manager, one of the one or more computer applications providing the requested functionality, downloading, by the remote marketplace client, the selected computer application and executing by the application manager, the downloaded computer application. Methods according to some embodiments may also include storing the downloaded computer application in a computer application repository of the computerized control system. Other embodiments include executing the downloaded computer application in a sandboxed application runtime.

According to other embodiments of a method for autonomously adding or deleting functionality from a computerized control system may include communicating functionality of the downloaded computer application from the sandboxed computer application runtime to a production runtime of the computerized control system. According to other embodiments of a method for autonomously adding or deleting functionality from a computer control system may include performing logic operations in the application manager, wherein selecting the one or more computer applications is based on the result of the logic operations. In other embodiments of a method for autonomously adding or deleting functionality from a computer control system may include developing one or more computer applications based at least in part on an application programming interface (API) providing interconnection between the one or more computer applications and the computerized control system. According to other embodiments of a method for autonomously adding or deleting functionality from a computer control system may include in a sensor of the computerized control system, measuring a value of a property of a component of the operational system, providing the value to the control processor of the computerized control system, in the computerized control system, identifying a functionality required based on the value and communicating the identified functionality in the request for functionality to the application manager. The value of the property of the component of the operational system is a temperature value and the request for functionality is the ability to request maintenance of the component of the operational system. According to another embodiment of a method for autonomously adding or deleting functionality of a computerized control system, the application manager may identify a computer application stored in the computer application repository that has not been executed within a predetermined time interval, and responsive to determining that the computer application has not been executed within the predetermined time interval, deleting the computer application from the computer application repository.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION

Aspects of embodiments of this disclosure include apparatuses and methods for adding and/or removing resources of a computerized control device autonomously. The computerized control device acts in the role a user as further described in greater detail below.

Figure 1:
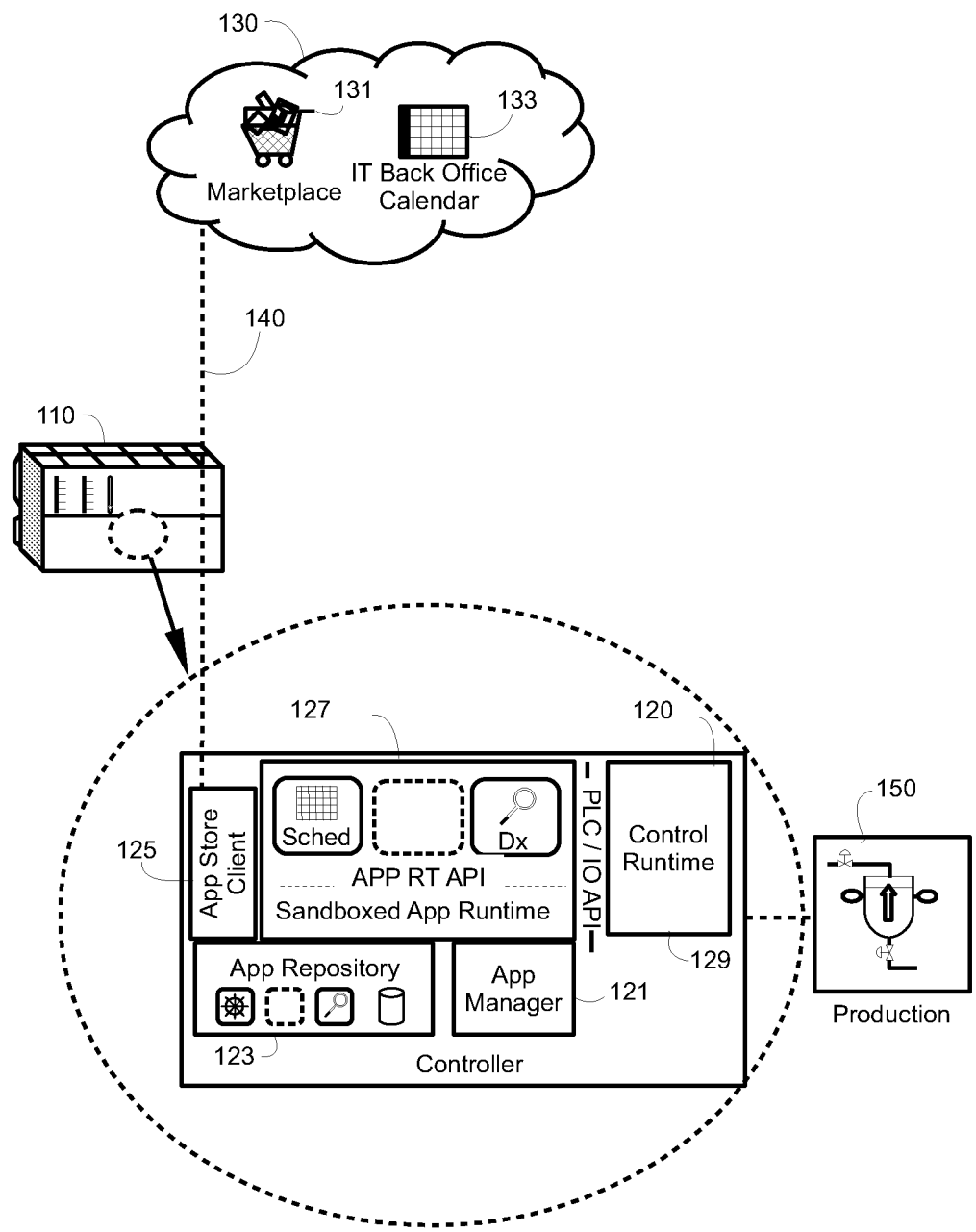
FIG. 1 is a block diagram of a system for autonomously providing functionality to a computerized control system according to aspects of an embodiment of the present disclosure.

FIG. 1 is a block diagram of a system for autonomously providing functionality to a computerized control system according to one embodiment of this disclosure. According to the embodiment of FIG. 1, a computerized control device is provided in the form of a PLC 110. The PLC 110 is installed in a manufacturing process or operational system and is configured to control some aspect of the manufacturing process by providing control signals to one or more machine components of the manufacturing process. By way of non-limiting example, the PLC may provide control signals to actuators that control a robotic device or may control the drive members of a conveyor or other motor associated with the manufacturing process. The PLC may receive as inputs, data relating to the state of components of the manufacturing process. For example, sensor readings associated with components of the manufacturing process may be received by the PLC. These data inputs may be further processed to produce outputs that serve as the control signals to control aspects of the manufacturing process.

In one particular non-limiting embodiment, a scenario may be considered in which a fault is detected in the production process 150. The PLC 110 recognizes the fault via control runtime 120 and is configured to address the fault by requesting maintenance that would address the fault. However, the PLC 110 presently lacks the functionality to request maintenance based on the current applications 127 running on the PLC 110. The presently running apps communicate a warning or error message to an app manager 121 resident on the PLC 110 informing the app manager 121 of its needs and sends a request for a resolution as conditions permit.

The app manager 121 connects to a remote marketplace or remote computer application repository 130 containing a number of varied computer applications 131, 133. One or more of the computer applications 131, 133, may be transferred to the PLC 110. The app manager 121 connects and communicates with the remote marketplace repository 130 via an app store client 125, which provides secure communications 140 between the PLC 110 and the repository or marketplace 130. The app store client 125 issues a query to the marketplace 130 to identify one or more apps which include functionality that meets the current needs of the PLC 110. Once identified, a particular app 131, 133 may be selected and downloaded to the PLC 110 from the repository/marketplace 130. Further, the app manager 121 may include program logic in the form of stored software instructions, to determine the utility of one or more apps 131, 133 offered by the repository/marketplace 130 and execute a decision whether or not to add the functionality via the app to the PLC 110 if deemed appropriate.

If the app manager 121 determines the functionality of a given app is desired, the given app 133 is downloaded from the repository 130 into a memory designated for storage of computer applications denoted as app repository 123. In the scenario depicted in FIG. 1, a downloaded app 133 may be identified as, "Maintenance Scheduler App" by way of example. After the downloaded app 133 is stored in the app repository 123 of the PLC 110, the app manager may issue instructions to launch the downloaded app. From that point forward, whenever the recognized fault is identified by the PLC, a maintenance event may be scheduled via the Maintenance Scheduler App.

A method for the autonomous configuration of a PLC will now be described according to aspects of embodiments of this disclosure. A caller app (e.g. a diagnostic app) that is lacking functionality can explicitly invoke parallel execution and data exchange with another app or implicitly request additional functionality. Implicit invocation means that it cannot or does not need or want to explicitly invoke that function by name. The reason for not binding a specific function is that it may be extremely rare, resources may be spared, or dynamic binding to the mode advanced or recent implementation is desirable. In implicit invocation, the caller app specifies its goal (e.g., "invoke an App with capabilities to schedule maintenance and report results in at most 1 day"). The app manager can address requests for such goals from apps executing in the app runtime sandbox. The app manager may implement the following functions.

- Reason how to address the requests specified as explicit invocation (should it request uploading the App or not?).
- Inquire about information needed to reason about how to bind the request to a requesting app in order to address an implicit invocation given as a "goal". This is done by requesting app capability information, which could only be obtained by external communication with a repository.
- Reason about the information available from the Caller App, the execution contest of all Sandbox/PLC applications, resources currently available (e.g., memory, CPU, I/O, and the like).
- Bind the request to a specific app and request the app store client to execute upload.
- Bridge an identical goal request for a solved goal to an existing app (e.g. Calendar App).
- Deactivate (unused or rarely used) apps to optimize resources.

The app store/repository client may perform the following functions:

- Address inquiries to bring app store availability information (existence of apps implementing capabilities, their input/output pattern, their requirements/constraints, and other properties.
- Upload apps.
- Communicate with repository external that is to automation/PLC network through secure means.

In more detail, one of the important abilities of the app manager is the reasoning process to bind an app according to an app functionality goal. In one instantiation, the binding can be done by reasoning using declarative knowledge regarding apps, (e.g., their capabilities, context information, PLC resources, etc.). For example, such declarative knowledge may specify rules implementing some or more of the following logic:

- Maximum memory fill up is 80%
- Minimum CPU available per PLC cycle is 22%
- Application X requires the following resources [ ]
- Application X has Capability 1 and Capability 2
- Application Y has Capability 2
- An application can be loaded if it satisfies Constraint 1 and Constraint 2

Figure 2:
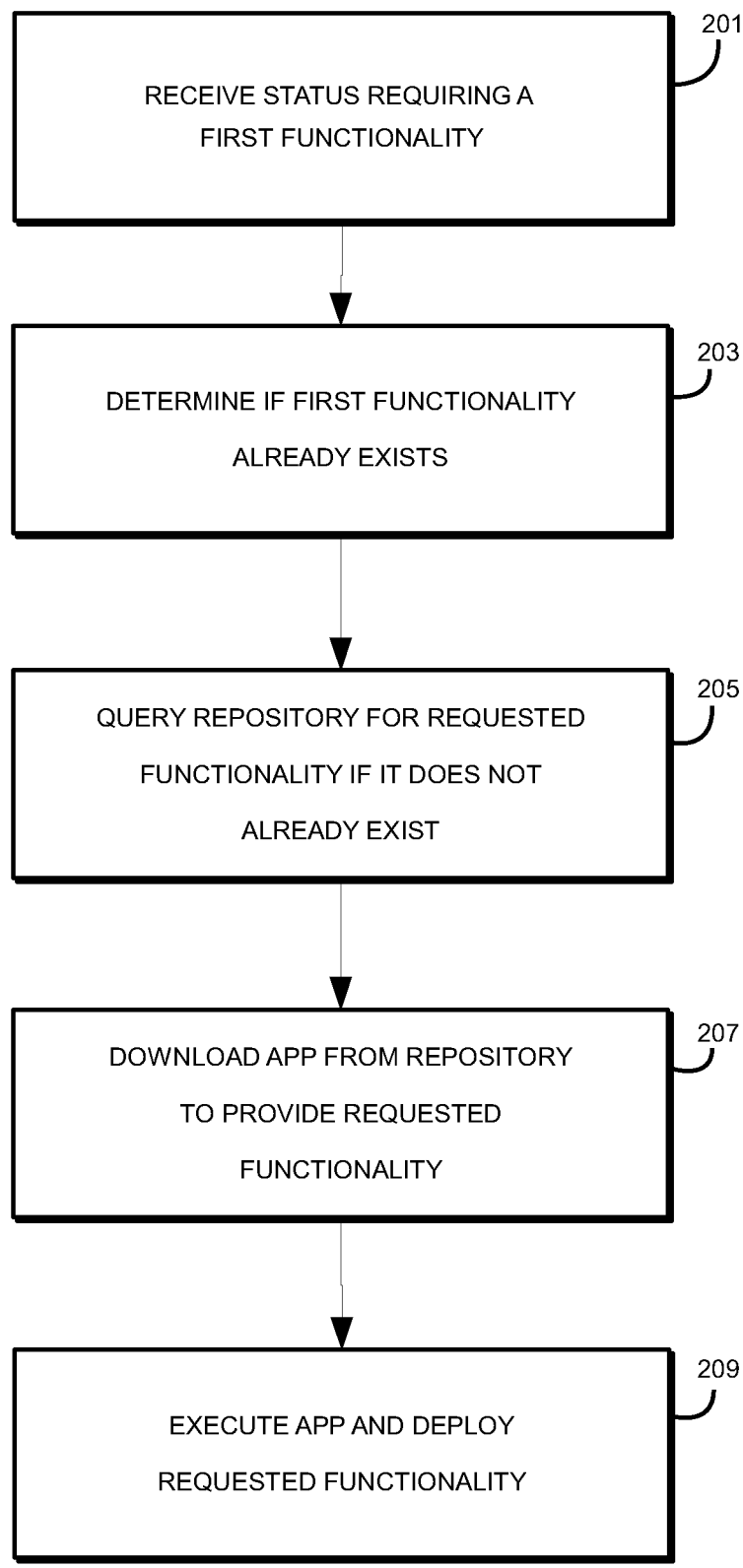
FIG. 2 is a process flow diagram for a method of autonomously providing functionality to a computerized control system according to aspects of an embodiment of the present disclosure.

FIG. 2 is a process flow diagram for autonomous addition or removal of functionality in a computerized control system according to aspects of embodiments of this disclosure. In a computerized control system, an application manager is employed to receive a request for functionality from the computerized control system 201. The request for functionality may come from an event encountered during the operation of the control system. By way of non-limiting example, a sensor associated with a controller may determine that maintenance is required on the controller. The controller needs to schedule maintenance but lacks the functionality of a maintenance scheduler. Accordingly, the controller forwards the request for this functionality to the application manager. The application manager then examines the computerized control system to determine if the requested functionality exists within the computerized control system 203. The computerized control system may include a computer application repository, or a location in system memory where one or more computer applications are stored. Information relating to each of the computer applications may include an indication of the functionality provided by each computer application. The application manager examines the information relating to the computer applications and in a case where the computerized control system does not presently possess the requested functionality, the application manager queries an outside marketplace or repository to determine if the marketplace or repository includes additional computer applications that are able to provide the requested functionality 205. If the repository or marketplace has an application that is capable of providing the functionality requested by the computerized control system, the application that provides the requested functionality is downloaded from the external marketplace or repository by an app store or marketplace client 207. Once downloaded, the new application is stored in the computer application repository of the computerized control system. The application manager may execute a command to launch the newly downloaded application to provide the requested functionality 209.

Functionality may be requested by the computerized control system either explicitly or implicitly. In an explicit request, the system may have information relating to a specific computer application that will provide the requested functionality. The application manager may transmit an explicit request to download and launch the specific computer application. In an implicit request, the computerized control system may not have knowledge of a specific computer application that is capable of providing the required functionality. In this case, the computerized control system may issue an implicit request which includes an abstraction of the required functionality, including information such as required outputs, or constraints relating to the processing of system data to produce the required functionality. In this way, an implicit request may act similarly to an aspect object used in Aspect Oriented Programming (AOP). The implicit request contains enough information about the required functionality that the marketplace or repository is able identify one or more computer applications that provide functionality that meets the criteria set out in the implicit request. A listing of candidate applications may be provided to the computer control system. Logic within the control system may select one of the candidate applications for download and execution.

Figure 3:
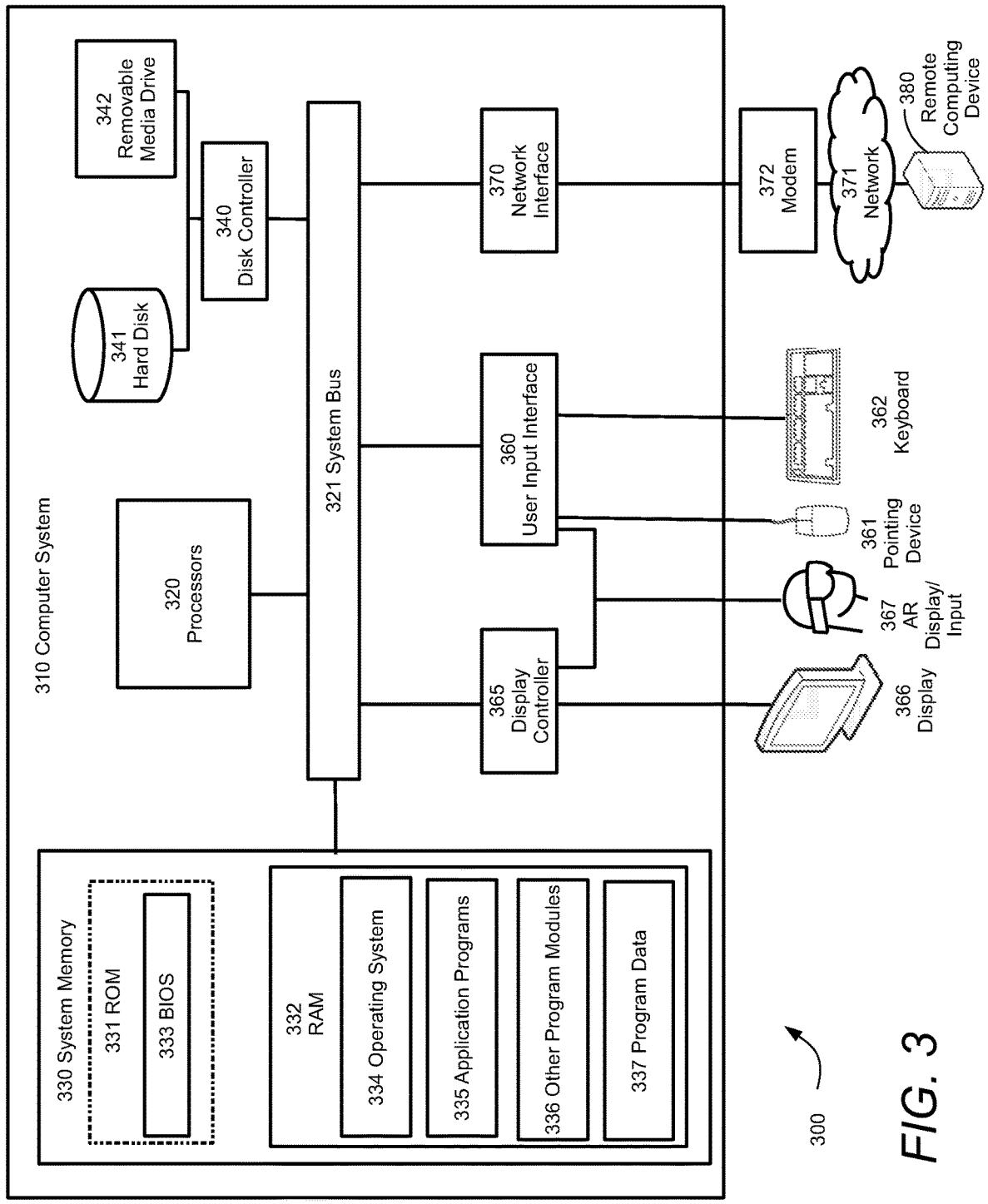
FIG. 3 is a block diagram of a computer system that may be used in a system for autonomously providing functionality to a computerized control system according to aspects of one or more embodiments of the present disclosure.

FIG. 3 illustrates an exemplary computing environment 300 within which embodiments of the invention may be implemented. Computers and computing environments, such as computer system 310 and computing environment 300, are known to those of skill in the art and thus are described briefly here.

As shown in FIG. 3, the computer system 310 may include a communication mechanism such as a system bus 321 or other communication mechanism for communicating information within the computer system 310. The computer system 310 further includes one or more processors 320 coupled with the system bus 321 for processing the information.

The processors 320 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 3, the computer system 310 also includes a system memory 330 coupled to the system bus 321 for storing information and instructions to be executed by processors 320. The system memory 330 may include computer readable storage media in the form of volatile and/or nonvolatile memory, such as read only memory (ROM) 331 and/or random access memory (RAM) 332. The RAM 332 may include other dynamic storage device(s) (e.g., dynamic RAM, static RAM, and synchronous DRAM). The ROM 331 may include other static storage device(s) (e.g., programmable ROM, erasable PROM, and electrically erasable PROM). In addition, the system memory 330 may be used for storing temporary variables or other intermediate information during the execution of instructions by the processors 320. A basic input/output system 333 (BIOS) containing the basic routines that help to transfer information between elements within computer system 310, such as during start-up, may be stored in the ROM 331. RAM 332 may contain data and/or program modules that are immediately accessible to and/or presently being operated on by the processors 320. System memory 330 may additionally include, for example, operating system 334, application programs 335, other program modules 336 and program data 337.

The computer system 310 also includes a disk controller 340 coupled to the system bus 321 to control one or more storage devices for storing information and instructions, such as a magnetic hard disk 341 and a removable media drive 342 (e.g., floppy disk drive, compact disc drive, tape drive, and/or solid state drive). Storage devices may be added to the computer system 310 using an appropriate device interface (e.g., a small computer system interface (SCSI), integrated device electronics (IDE), Universal Serial Bus (USB), or FireWire).

The computer system 310 may also include a display controller 365 coupled to the system bus 321 to control a display or monitor 366, such as a cathode ray tube (CRT) or liquid crystal display (LCD), for displaying information to a computer user. The computer system includes an input interface 360 and one or more input devices, such as a keyboard 362 and a pointing device 361, for interacting with a computer user and providing information to the processors 320. The pointing device 361, for example, may be a mouse, a light pen, a trackball, or a pointing stick for communicating direction information and command selections to the processors 320 and for controlling cursor movement on the display 366. The display 366 may provide a touch screen interface which allows input to supplement or replace the communication of direction information and command selections by the pointing device 361. In some embodiments, an augmented reality device 367 that is wearable by a user, may provide input/output functionality allowing a user to interact with both a physical and virtual world. The augmented reality device 367 is in communication with the display controller 365 and the user input interface 360 allowing a user to interact with virtual items generated in the augmented reality device 367 by the display controller 365. The user may also provide gestures that are detected by the augmented reality device 367 and transmitted to the user input interface 360 as input signals.

The computer system 310 may perform a portion or all of the processing steps of embodiments of the invention in response to the processors 320 executing one or more sequences of one or more instructions contained in a memory, such as the system memory 330. Such instructions may be read into the system memory 330 from another computer readable medium, such as a magnetic hard disk 341 or a removable media drive 342. The magnetic hard disk 341 may contain one or more datastores and data files used by embodiments of the present invention. Datastore contents and data files may be encrypted to improve security. The processors 320 may also be employed in a multi-processing arrangement to execute the one or more sequences of instructions contained in system memory 330. In alternative embodiments, hard-wired circuitry may be used in place of or in combination with software instructions. Thus, embodiments are not limited to any specific combination of hardware circuitry and software.

As stated above, the computer system 310 may include at least one computer readable medium or memory for holding instructions programmed according to embodiments of the invention and for containing data structures, tables, records, or other data described herein. The term "computer readable medium" as used herein refers to any medium that participates in providing instructions to the processors 320 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 341 or removable media drive 342. Non-limiting examples of volatile media include dynamic memory, such as system memory 330. Non-limiting examples of transmission media include coaxial cables, copper wire, and fiber optics, including the wires that make up the system bus 321. Transmission media may also take the form of acoustic or light waves, such as those generated during radio wave and infrared data communications.

The computing environment 300 may further include the computer system 310 operating in a networked environment using logical connections to one or more remote computers, such as remote computing device 380. Remote computing device 380 may be a personal computer (laptop or desktop), a mobile device, a server, a router, a network PC, a peer device or other common network node, and typically includes many or all of the elements described above relative to computer system 310. When used in a networking environment, computer system 310 may include modem 372 for establishing communications over a network 371, such as the Internet. Modem 372 may be connected to system bus 321 via user network interface 370, or via another appropriate mechanism.

Network 371 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 310 and other computers (e.g., remote computing device 380). The network 371 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 371.

In conclusion, we highlight the built-in capability of the PLC/embedded system to add or remove functionality on demand or as the context requires, and the built-in capability to reason about its context (internal execution, and external flexible app availability) and manage its resources in order to automatically and transparently exhibit this advanced behavior.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

What is claimed is:

1. A system for autonomously providing functionality to a computerized control system comprising:
   a hardware logic controller running a first computer application relating to an operations system;
   an application manager stored in a memory, the application manager configured to receive requests for functionality from the first computer application;
   a remote marketplace client in communication with the application manager and a remote marketplace, the remote marketplace offering computer applications for providing a plurality of functionalities relating to the operations system;
   a computer application repository defining one or more memories for storage of computer applications providing functionality of the operations system, wherein responsive to receiving the request for functionality, the application manager forwards the request to the remote marketplace client, the remote marketplace client sends a query to the remote marketplace for the requested functionality and provides results of the query to the application manager, such that the application manager is further configured to perform logic operations on the results of the query, and identify a computer application in the remote marketplace for providing the requested functionality, so as to define an identified computer application that can be transferred to the computer application repository so as to further define a transferred application;
   a computerized application run-time environment for executing one or more computer applications stored in the computer application repository; and
   an application runtime application programming interface (API) for providing interconnection of a computer application to functionality of the operations system,
   wherein the transferred application is developed based at least in part on the application runtime API.

2. The system of claim 1, wherein the remote marketplace client receives the identified computer application from the application manager and responsive to receipt of the identified computer application initiates a transfer of the identified computer application from the remote marketplace to the computer application repository.

3. The system of claim 1, wherein the application manager is configured to determine if functionality associated with a computer application stored in the computer application repository has not been used for a time interval that exceeds a predetermined threshold, and deleting the computer application if its functionality has not been used in the time interval.

4. The system of claim 1, wherein the first computer application is a diagnostics application of the operations system, and the request for functionality is a request for maintenance scheduling.

5. The system of claim 1, further comprising:
a control runtime, configured to receive input values of the operations system and calculate output values of the operations system.

6. The system of claim 5, wherein the operations system is controlled in a first part by the control runtime, and in a second part by the computer application runtime.

7. A method for providing autonomously adding or deleting functionality from a computer control system comprising:
in a control processor, generating a request for functionality based on an output value of an element of an operational system;
receiving in an application manager, the request for functionality;
communicating the request for functionality to a remote marketplace client from the application manager;
querying, by the remote marketplace client, a remote application marketplace to identify one or more computer applications providing the requested functionality;
selecting, in the application manager, one of the one or more computer applications providing the requested functionality;
downloading, by the remote marketplace client, the selected computer application; and
executing by the application manager, the downloaded computer application; and
developing one or more computer applications based at least in part on an application programming interface (API) providing interconnection between the one or more computer applications and the computerized control system.

8. The method of claim 7, further comprising:
storing the downloaded computer application in a computer application repository of the computerized control system.

9. The method of claim 8, further comprising:
in the application manager, identifying a computer application stored in the computer application repository that has not been executed within a predetermined time interval, and responsive to determining that the computer application has not been executed within the predetermined time interval, deleting the computer application from the computer application repository.

10. The method of claim 7, further comprising:
executing the downloaded computer application in a sandboxed application runtime.

11. The method of claim 10, further comprising:
communicating functionality of the downloaded computer application from the sandboxed computer application runtime to a production runtime of the computerized control system.

12. The method of claim 7, further comprising:
performing logic operations in the application manager, wherein selecting the one or more computer applications is based on the result of the logic operations.

13. The method of claim 7, further comprising:
in a sensor of the computerized control system, measuring a value of a property of a component of the operational system;
providing the value to the control processor of the computerized control system;
in the computerized control system, identifying a functionality required based on the value; and
communicating the identified functionality in the request for functionality to the application manager.

14. The method of claim 13, wherein the value of the property of the component of the operational system is a temperature value.

15. The method of claim 14, wherein the request for functionality is the ability to request maintenance of the component of the operational system.

* * * * *